Sept. 19, 1967  A. J. ROSS  3,342,207
FLOAT VALVE
Filed July 17, 1964
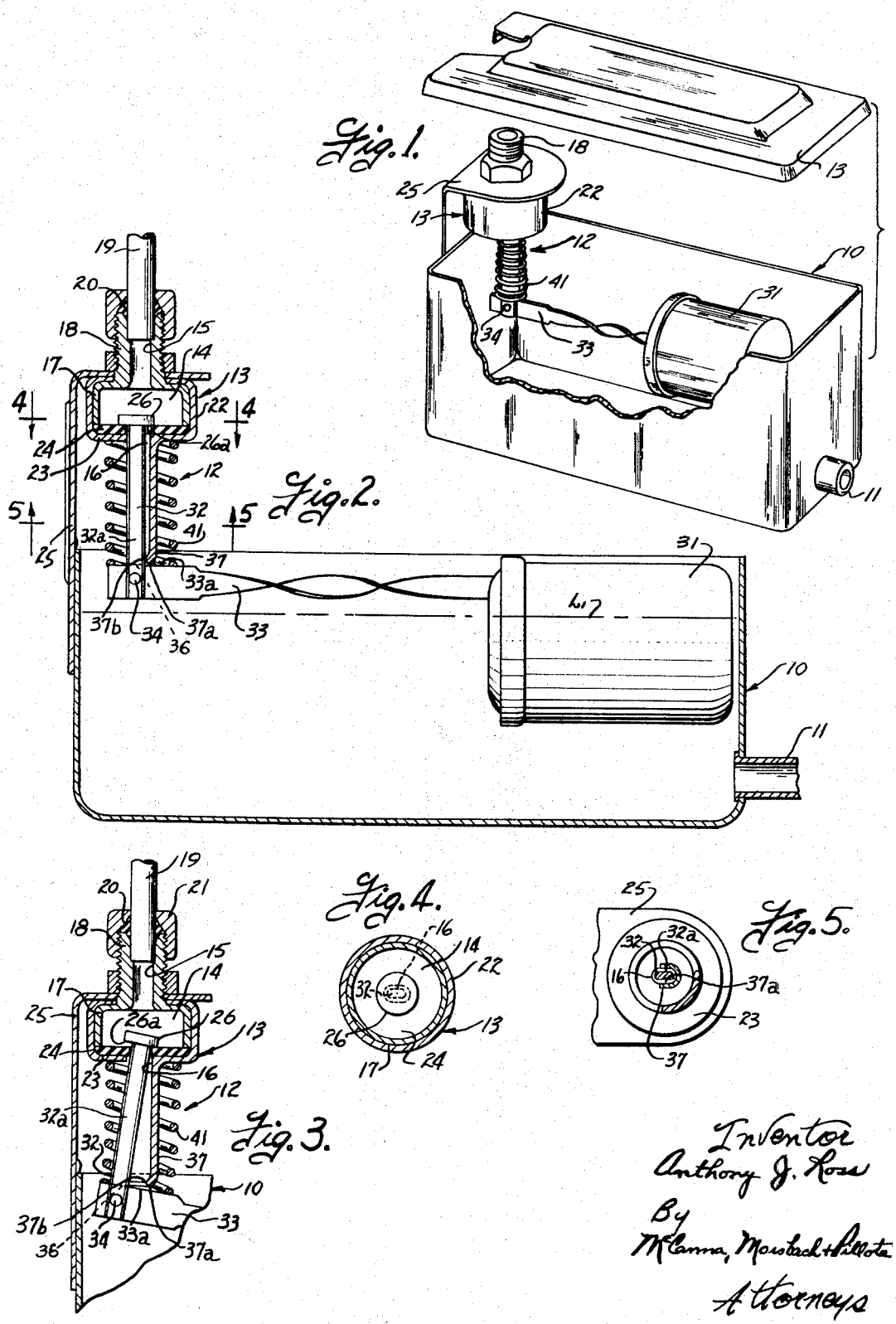
Inventor
Anthony J. Ross
By
McCanna, Morsbach & Pillote
Attorneys

United States Patent Office 3,342,207
Patented Sept. 19, 1967

3,342,207
FLOAT VALVE
Anthony J. Ross, 116 Myrtle Ave.,
Elmhurst, Ill. 60126
Filed July 17, 1964, Ser. No. 383,320
5 Claims. (Cl. 137—448)

This invention relates to liquid level control apparatus.

The present invention pertains to improvements in float control valves of the type disclosed in my Patent No. 3,095,896, issued July 2, 1963, and wherein the valve member normally overlies the outlet passage in the valve so that the fluid pressure tends to hold the valve member closed, and in which the valve member is tiltable relative to the valve seat between open and closed positions under the control of a float.

It is an important object of this invention to provide a float valve of simple and economical construction and which effects reliable opening and closing of the valve to maintain a preselected liquid level in a reservoir, under widely different pressure conditions in the liquid supply line.

Another object of this invention is to provide a float controlled valve of the type described which provides more positive closing of the valve when the liquid acting on the float member reaches the desired level.

A more particular object of this invention is to provide a float controlled valve in which the valve member is tiltable away from the seat by the float when the liquid level drops and is moved back to a position flush with the seat as the liquid level rises, and in which the float applies a force to the valve member in a direction to firmly press the valve member against the seat when the liquid level rises above the preset level to thereby effect more positive seating of the valve.

These, together with other objects and advantages of this invention will be appreciated as the invention becomes better understood by reference to the following detailed description when taken in connection with the accompanying drawings wherein:

FIG. 1 is a perspective view of the float valve with the cover raised and part of the float reservoir broken away to illustrate details of construction;

FIG. 2 is a longitudinal sectional view through the valve showing the valve in its closed position;

FIG. 3 is a fragmentary sectional view through the valve illustrating the same in its open position;

FIG. 4 is a fragmentary transverse sectional view taken on the plane 4—4 of FIG. 2; and FIG. 5 is a transverse sectional view taken on the plane 5—5 of FIG. 2.

The float valve includes a tank or reservoir 10 having an outlet 11 through which fluid is withdrawn and a float controlled valve 12 for controlling the supply of liquid to the reservoir to maintain the liquid at a preselected level L1 therein. A removable cover 13 may be provided for the reservoir, if desired.

The valve 12 includes a valve body 13 which defines a valve chamber 14 having an inlet 15 and an outlet 16. In the embodiment illustrated, a first cup-shaped member 17 is formed with a reduced diameter externally threaded extension 18 at one end which defines the inlet passage 15. The fluid supply line 19 extends into the passage 15 and is sealed to the sleeve 18 as by a seal ring 20 and a compression nut 21. A second cup-shaped body 22 surrounds the body 17 and has an inwardly extending wall 23 at one end with the aforementioned outlet passage 16 formed in the wall 23. A resilient valve face member 24 overlies the wall 23 around the outlet opening. The seal face can conveniently extend to the outer periphery of the wall 23 and is clamped to the wall by the inner cup-shaped member 17. The inner and outer cup-shaped members are secured in assembled relation and as shown, the outer member has the edge thereof swaged or spun over the inner member.

The valve body 13 is mounted by a bracket 25 on the reservoir with the outlet opening 16 facing downwardly. A valve member 26 is interposed in the chamber 14 and has a valve face 26a on the underside thereof which cooperates with the valve seat 24. The valve member closes the outlet passage 16 when the valve face 26a is disposed flush with the seat 24 and the valve member is tiltable relative to the seat as shown in FIG. 3 to an open position to allow fluid to pass through the outlet passage. As will be seen, the fluid pressure in the chamber 14 acts on the inner face of the valve member and when the valve member is closed, applies pressure to the valve member to aid in holding the valve member in its closed position.

An arm member is provided for connecting the valve member 26 to a float 31, which arm member includes a stem portion 32 rigidly attached to or formed integrally with the valve member 26 and extending downwardly from the valve member through the outlet opening 16. The arm member also includes an arm portion 33 which is attached to the lower end of the stem portion 32 and extends laterally from the stem portion. The arm portion may be formed integrally with the stem portion or may be attached to the stem portion in any suitable manner which will substantially inhibit relative movement between the stem and arm portions. As shown, the arm portion is affixed to the stem portion by a fastener 34 and the stem portion is preferably notched to receive the arm portion and provide a shoulder 36 engageable with the arm portion to inhibit relative movement between the stem and arm portions around the pin 34.

A guide member 37 is attached to the valve body 13 and, as shown, is formed integrally with the cup-shaped member 22 and extends alongside the stem portion 32. In narrow float tanks it is desirable to constrain movement of the float and float arm to a single plane extending through the stem portion 32 and arm portion 33 and for this purpose the stem portion 32 is preferably formed with a non-circular cross section defining opposed guide faces 32a which extend generally parallel to the plane of movement of the float. The guide 37 and preferably the outlet opening 16 are formed with a non-circular opening to prevent axial turning of the stem portion and the guide is preferably formed with a U-shaped cross section defining opposed guide faces 37a which engage the faces 32a on the stem portion to confine swinging movement of the arm. Alternatively if the float is disposed in a large tank, it is not necessary to constrain the float from turning about the axis of the stem 32.

As previously mentioned, the fluid pressure in the valve chamber 14 acting on the valve member 26 aids in holding the valve member in its closed position. However, the fluid pressure in the supply line 19 and hence in the chamber 14 varies widely in different installations and at different times in the same installation. A spring 41 is provided for yieldably urging the valve member toward its closed position, to aid seating the valve member under low line pressure conditions. The spring is advantageously of the coil type and loosely surrounds the valve member to permit lateral swinging of the valve member. The spring is interposed between the valve body 13 and the arm portion 33 and yieldably urges the stem in a direction to press the valve member 26 against the seat 24.

The guide member 37 and float arm are constructed so as to assure positive seating of the valve member when the liquid reaches the preselected upper level L1. As shown in FIGS. 2 and 3, the arm portion 33 defines a shoulder 33a which extends laterally from the stem portion 32 at a point spaced from the valve face 26a. Alternatively, a separate means may be provided on the stem to provide the aforementioned laterally extending shoulder. The end of the guide member 37 is also formed with a shoulder designated 37a which is spaced below the valve seat 24 a distance approximately equal to the spacing between the shoulder 33a and the valve face 26a. The shoulder 37a on the guide is positioned at the side of the stem adjacent the float 31 and is arranged to engage the shoulder 33a when the float reaches its upper level as shown in FIG. 2. The shoulder 37a on the arm drops away from the shoulder 33a on the guide as the float moves downwardly and, when the float moves upwardly the shoulder 37a engages the shoulder 33a to urge the stem downwardly and draw the valve member 26 downwardly against the seat 24. Thus, in effect, the shoulder 37a forms a fulcrum for the float arm, when the float reaches its upper level, so that the upward buoyant force of the water on the float 31 is applied through a force multiplying leverage system to aid in drawing the valve member 26 firmly to its closed position. Preferably, the guide member also has a second stop face indicated at 37b which is arranged to engage the stem 32 of the valve member, when the valve member is in its closed position shown in FIG. 2. By locating the shoulder 37a on the guide closely adjacent to the juncture of the arm portion 33 with the stem 32, even the relatively small upward pressure on the float 31 will apply a relatively high pressure force on the valve member 26 to draw it to its closed position. As will be seen, the shoulder 37a engages the shoulder 33a at point laterally offset from the axis of the valve member so that the shoulder 33a drops away from the shoulder 37a as the valve member moves toward its open position shown in FIG. 3.

From the foregoing, it is thought that the construction and operation of the float valve will be readily understood. When the valve is in the closed position shown in FIG. 2, the valve member is pressed firmly against the seat 24 by the fluid pressure in the chamber 14 acting on the valve member and by the spring pressure of spring 41. In addition, the shoulders 33a and 37a on the float arm and guide cooperate to assure that the valve member is disposed against the seat as the float reaches its upper level shown in FIG. 2. If, for any reason, the liquid level starts to rise above the upper level L1, as may occur due to backflow through the outlet 11 or leakage of the valve, the upward movement of the float 31 will cause the float arm to fulcrum around the shoulder 37a and draw the valve member 26 more firmly against the seat 24. In this manner, positive and reliable shut off from the float is assured.

I claim:
1. A liquid level control valve for maintaining a preselected liquid level in a reservoir comprising, a valve body defining a chamber having a liquid inlet passage and a downwardly facing outlet passage, said body having a seat on the inner side of the body around the outlet passage, a valve member loosely positioned in said chamber in overlying relation to said outlet passage and having a face operable in one position of the valve member to block flow through the outlet passage, the valve face being tiltable with the valve member relative to the seat to thereby open for flow through the outlet passage, an arm member rigidly attached to said valve member and including a stem portion extending downwardly from said valve member through said outlet passage and an arm portion on said stem portion at a point spaced below said face on the valve member and extending laterally from said stem portion, a float attached to said arm portion at a point laterally offset from said stem portion and normally gravitationally urging said arm member downwardly to tilt said valve member relative to its seat away from said one position, said float being adapted to be buoyed upwardly as the water level in the reservoir rises and operative in a preselected upper position thereof to support said valve member in said one position and thereby stop flow through said outlet passage, said arm member having a first upwardly facing shoulder spaced a preselected distance below said valve face and extending laterally from the stem portion at the side thereof toward said float, and means defining a second downwardly facing shoulder disposed in fixed relation to said seat at a point spaced below said seat a distance approximately equal to said preselected distance to engage said first shoulder when the valve member reaches said one position.

2. A liquid level control valve for maintaining a preselected liquid level in a reservoir comprising, a valve body defining a chamber having a liquid inlet passage and a downwardly facing outlet passage, said body having a seat on the inner side of the body around the outlet passage, a valve member loosely positioned in said chamber in overlying relation to said outlet passage and having a face operable in one position of the valve member to block flow through the outlet passage, the valve face being tiltable with the valve member relative to the seat to thereby open for flow through the outlet passage, an arm member rigidly attached to said valve member and including a stem portion extending downwardly from said valve member through said outlet passage and an arm portion on said stem portion at a point spaced below said face on the valve member and extending laterally from said stem portion, a float attached to said arm portion at a point laterally offset from said stem portion and normally gravitationally urging said arm member downwardly to tilt said valve member relative to its seat away from said one position, said float being adapted to be buoyed upwardly as the water level in the reservoir rises and operative in a preselected upper position thereof to support said valve member in said one position and thereby stop flow through said outlet passage, said arm member having a first upwardly facing shoulder spaced a preselected distance below said valve face and extending laterally from the step portion at the side thereof toward said float, a guide on said valve body and extending downwardly therefrom, the guide having a second downwardly facing shoulder adjacent the lower end thereof spaced below said seat a distance approximately equal to said preselected distance and positioned to engage said first shoulder and said stem portion when the valve member is in said one position.

3. A liquid level control valve for maintaining a preselected liquid level in a reservoir comprising, a valve body defining a chamber having a liquid inlet passage and a downwardly facing outlet passage, said body having a seat on the inner side of the body around the outlet passage, a valve member loosely positioned in said chamber in overlying relation to said outlet passage and having a face operable in one position of the valve member to block flow through the outlet passage, the valve face being tiltable with the valve member relative to the seat to thereby open for flow through the outlet passage, an arm member rigidly attached to said valve member and including a stem portion extending downwardly from said valve member through said outlet passage and an arm portion on said stem portion at a point spaced below said face on the valve member and extending laterally from said stem portion, a float attached to said arm portion at a point laterally offset from said stem portion and normally gravitationally urging said arm member downwardly to tilt said valve member relative to its seat away from said one position, said float being adapted to be buoyed upwardly as the water level in the reservoir rises and operative in a preselected upper position thereof to support said valve member in said one position and thereby stop flow through said outlet passage, said arm member having a first upwardly facing shoulder spaced a preselected distance below said valve face and extending laterally from the stem portion at the side thereof toward said float, a guide on said valve body and extending downwardly therefrom alongside the stem portion, the stem portion having a non-circular cross section and the guide having spaced guide portions engageable with opposite sides of the stem portion to inhibit axial turning of the stem portion and to confine swinging of the stem portion to movement in a plane through said stem portion and arm portion, the guide having a second downwardly facing shoulder adjacent its lower end spaced below said seat a distance approximately equal to said preselected distance and extending crosswise of said plane at the side of the stem portion adjacent the float to engage said first shoulder when the valve member is in said one position.

4. The combination of claim 3 including a longitudinally resilient and laterally flexible spring interposed between said valve body and said arm portion of said arm member.

5. A liquid level control valve for maintaining a preselected liquid level in a reservoir comprising, a valve body defining a chamber having a liquid inlet passage and a downwardly facing outlet passage, said body having a seat on the inner side of the body around the outlet passage, a valve member loosely positioned in said chamber in overlying relation to said outlet passage and having a face operable in one position of the valve member to block flow through the outlet passage, the valve face being tiltable with the valve member relative to the seat to thereby open for flow through the outlet passage, an arm member rigidly attached to said valve member and including a stem portion extending downwardly from said valve member through said outlet passage and an arm portion on said stem portion at a point spaced below said face on the valve member and extending laterally from said stem portion, a float attached to said arm portion at a point laterally offset from said stem portion and normally gravitationally urging said arm member downwardly to tilt said valve member relative to its seat away from said one position, said float being adapted to be buoyed upwardly as the water level in the reservoir rises and operative in a preselected upper position thereof to support said valve member in said one position and thereby stop flow through said outlet passage, said arm portion defining a first upwardly facing shoulder spaced a preselected distance below said valve face and extending laterally from said stem portion at the side thereof toward said float, a guide on said valve body and having a second downwardly facing shoulder adjacent the lower end thereof spaced below the seat a distance approximately equal to said preselected distance and positioned to engage said first shoulder on said arm portion adjacent its juncture with said stem portion when said valve member is in said one position, and means on said guide guidably engaging said arm member for inhibiting axial turning of the stem portion relative to the seat and to confine swinging of the stem portion to movement in the plane through the stem portion and arm portion of the arm member.

References Cited

UNITED STATES PATENTS

| | | | |
|---|---|---|---|
| 2,559,046 | 7/1951 | Peters et al. | 137—434 X |
| 3,095,896 | 7/1963 | Ross | 137—448 |

WILLIAM F. O'DEA, *Primary Examiner.*

D. R. MATTHEWS, *Assistant Examiner.*